(12) United States Patent
Djordjev

(10) Patent No.: US 7,612,933 B2
(45) Date of Patent: Nov. 3, 2009

(54) MICROELECTROMECHANICAL DEVICE WITH SPACING LAYER

(75) Inventor: Kostadin Djordjev, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 2 days.

(21) Appl. No.: 12/057,161

(22) Filed: Mar. 27, 2008

(65) Prior Publication Data

US 2009/0244686 A1 Oct. 1, 2009

(51) Int. Cl.
G02B 26/00 (2006.01)
(52) U.S. Cl. .................................. 359/290; 359/291
(58) Field of Classification Search .................. 359/290, 359/291
See application file for complete search history.

(56) References Cited

U.S. PATENT DOCUMENTS

| | | | |
|---|---|---|---|
| 3,728,030 A | 4/1973 | Hawes | |
| 3,955,190 A | 5/1976 | Teraishi | |
| 4,403,248 A | 9/1983 | te Velde | |
| 4,441,791 A | 4/1984 | Hornbeck | |
| 4,786,128 A | 11/1988 | Birnbach | |
| 4,859,060 A | 8/1989 | Katagiri et al. | |
| 4,954,789 A | 9/1990 | Sampsell | |
| 4,956,619 A | 9/1990 | Hornbeck | |
| 4,982,184 A | 1/1991 | Kirkwood | |
| 5,022,745 A | 6/1991 | Zahowski et al. | |
| 5,028,939 A | 7/1991 | Hornbeck et al. | |
| 5,091,983 A | 2/1992 | Lukosz | |
| 5,096,279 A | 3/1992 | Hornbeck et al. | |
| 5,315,370 A | 5/1994 | Bulow | |
| 5,381,232 A | 1/1995 | Van Wijk | |
| 5,471,341 A | 11/1995 | Warde et al. | |
| 5,526,172 A | 6/1996 | Kanack | |
| 5,559,358 A | 9/1996 | Burns et al. | |
| 5,636,052 A | 6/1997 | Arney et al. | |
| 5,646,729 A | 7/1997 | Koskinen et al. | |
| 5,646,768 A | 7/1997 | Kaeiyama | |
| 5,661,592 A | 8/1997 | Bornstein et al. | |
| 5,665,997 A | 9/1997 | Weaver et al. | |
| 5,710,656 A | 1/1998 | Goosen | |
| 5,786,927 A | 7/1998 | Greywall et al. | |
| 5,808,781 A | 9/1998 | Arney et al. | |

(Continued)

FOREIGN PATENT DOCUMENTS

EP 1 122 577 8/2001

(Continued)

OTHER PUBLICATIONS

Pape et al., Characteristics of the deformable mirror device for optical information processing, Optical Engineering, 22(6):676-681, Nov.-Dec. 1983.

(Continued)

*Primary Examiner*—Jordan M. Schwartz
*Assistant Examiner*—James C Jones
(74) *Attorney, Agent, or Firm*—Knobbe Martens Olson & Bear LLP

(57) ABSTRACT

An interferometric modulating device is provided with a spacing layer positioned between the fixed reflector and the electrode. The spacing layer prevents shorting between the movable reflector and the electrode and provides a filtering cavity to improve color saturation.

29 Claims, 12 Drawing Sheets

U.S. PATENT DOCUMENTS

| | | |
|---|---|---|
| 5,818,095 A | 10/1998 | Sampsell |
| 5,825,528 A | 10/1998 | Goosen |
| 5,838,484 A | 11/1998 | Goossen et al. |
| 5,867,302 A | 2/1999 | Fleming |
| 6,028,689 A | 2/2000 | Michalicek et al. |
| 6,040,937 A | 3/2000 | Miles |
| 6,055,090 A | 4/2000 | Miles |
| 6,262,697 B1 | 7/2001 | Stephenson |
| 6,327,071 B1 | 12/2001 | Kimura |
| 6,356,378 B1 | 3/2002 | Huibers |
| 6,384,952 B1 | 5/2002 | Clark et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,794,119 B2 | 9/2004 | Miles |
| 6,841,081 B2 | 1/2005 | Chang et al. |
| 6,844,959 B2 | 1/2005 | Huibers et al. |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,980,350 B2 | 12/2005 | Hung et al. |
| 6,982,820 B2 | 1/2006 | Tsai |
| 7,006,272 B2 | 2/2006 | Tsai |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,202 B2 | 2/2007 | Miles et al. |
| 7,198,973 B2 | 4/2007 | Lin et al. |
| 7,221,495 B2 | 5/2007 | Miles et al. |
| 7,236,284 B2 | 6/2007 | Miles |
| 7,289,259 B2 | 10/2007 | Chui et al. |
| 7,302,157 B2 | 11/2007 | Chui |
| 7,321,456 B2 | 1/2008 | Cummings |
| 7,321,457 B2 | 1/2008 | Heald |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,420,725 B2 | 9/2008 | Kothari |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0078348 A1 | 4/2005 | Lin |
| 2005/0168849 A1 | 8/2005 | Lin |
| 2005/0179378 A1 | 8/2005 | Oooka et al. |
| 2005/0195462 A1 | 9/2005 | Lin |
| 2005/0249966 A1 | 11/2005 | Tung et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066936 A1 | 3/2006 | Chui et al. |
| 2006/0066938 A1* | 3/2006 | Chui .......................... 359/291 |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0079048 A1 | 4/2006 | Sampsell |
| 2006/0220160 A1 | 10/2006 | Miles |
| 2006/0262380 A1 | 11/2006 | Miles |
| 2006/0268388 A1 | 11/2006 | Miles |
| 2006/0274398 A1 | 12/2006 | Chou |
| 2007/0086078 A1 | 4/2007 | Hagood et al. |
| 2007/0121118 A1 | 5/2007 | Gally et al. |
| 2007/0177247 A1 | 8/2007 | Miles |
| 2007/0194630 A1 | 8/2007 | Mignard et al. |
| 2007/0216987 A1 | 9/2007 | Hagood et al. |
| 2007/0279729 A1 | 12/2007 | Kothari et al. |
| 2008/0013144 A1 | 1/2008 | Chui et al. |
| 2008/0013145 A1 | 1/2008 | Chui et al. |
| 2008/0013154 A1 | 1/2008 | Chui |
| 2008/0037093 A1 | 2/2008 | Miles |
| 2008/0055705 A1 | 3/2008 | Kothari |
| 2008/0055706 A1 | 3/2008 | Chui et al. |
| 2008/0055707 A1 | 3/2008 | Kogut et al. |
| 2008/0080043 A1 | 4/2008 | Chui et al. |
| 2008/0088904 A1 | 4/2008 | Miles |

| | | | |
|---|---|---|---|
| 2008/0088910 A1 | 4/2008 | Miles | |
| 2008/0088911 A1 | 4/2008 | Miles | |
| 2008/0088912 A1 | 4/2008 | Miles | |
| 2008/0094690 A1 | 4/2008 | Luo et al. | |
| 2008/0106782 A1 | 5/2008 | Miles | |
| 2008/0110855 A1 | 5/2008 | Cummings | |
| 2008/0112035 A1 | 5/2008 | Cummings | |
| 2008/0112036 A1 | 5/2008 | Cummings | |
| 2008/0186581 A1 | 8/2008 | Bita et al. | |
| 2008/0239455 A1 | 10/2008 | Kogut et al. | |
| 2008/0247028 A1 | 10/2008 | Chui et al. | |
| 2008/0278787 A1 | 11/2008 | Sasagawa | |
| 2008/0278788 A1 | 11/2008 | Sasagawa | |
| 2008/0316566 A1 | 12/2008 | Lan | |
| 2008/0316568 A1 | 12/2008 | Griffiths et al. | |
| 2009/0009845 A1 | 1/2009 | Endisch et al. | |

FOREIGN PATENT DOCUMENTS

| | | |
|---|---|---|
| EP | 1 275 997 | 1/2003 |
| EP | 1 473 581 | 11/2004 |
| JP | 11211999 | 8/1999 |
| JP | 2002-062490 | 2/2000 |
| JP | 2001-221913 | 8/2001 |
| JP | 2002-221678 | 8/2002 |
| JP | 2003-340795 | 2/2003 |
| JP | 2004-205973 | 7/2004 |
| JP | 2004-212638 | 7/2004 |
| JP | 2004-212680 | 7/2004 |
| JP | 2005 279831 | 10/2005 |

OTHER PUBLICATIONS

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Conner, "Hybrid Color Display Using Optical Interference Filter Array," SID Digest, pp. 577-580 (1993).

Feenstra et al., Electrowetting displays, Liquivista BV, 16 pp., Jan. 2006.

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Lezec, Submicrometer dimple array based interference color field displays and sensors, Nano Lett. 7(2):329-333, Dec. 23, 2006.

Miles, A New Reflective FPD Technology Using Interferometric Modulation, Journal of the SID, 5/4, 1997.

Taii et al., "A transparent sheet display by plastic MEMS," Journal of the SID 14(8):735-741, 2006.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

MICROELECTROMECHANICAL DEVICE WITH SPACING LAYER

BACKGROUND

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In certain embodiments, a device comprises an electrode, a fixed reflector, a movable reflector comprising an electrically conductive material, wherein an interferometric modulating cavity is defined between the movable reflector and the fixed reflector, the movable reflector being movable between at least a first position, a second position, and a third position. The device also comprises a spacing layer positioned between the fixed reflector and the electrode, the spacing layer providing a filtering cavity.

In certain embodiments, a device comprises an electrode, a fixed reflector, a movable reflector comprising an electrically conductive material, wherein an interferometric modulating cavity is defined between the movable reflector and the fixed reflector, the movable reflector being movable between at least a first position, a second position, and a third position. The device also comprises a spacing layer positioned between the fixed reflector and the electrode, the spacing laying being greater than or equal to 160 nm in thickness from a cross-sectional view of the device.

In certain embodiments, a device comprises an electrode, a first, fixed means for reflecting light, a second, movable means for reflecting light. The second reflecting means comprises an electrically conductive material, wherein an interferometric modulating cavity is defined between the first reflecting means and the second reflecting means. The second reflecting means is movable between at least a first position, a second position, and a third position. The device also comprises means for separating the first reflecting means and the electrode, the separating means providing a filtering cavity.

In certain embodiments, a method of making a device for modulating light comprises forming an electrode, forming a spacing layer, forming a fixed reflector, and forming a movable reflector comprising an electrically conductive material. An interferometric modulating cavity is defined between the movable reflector and the fixed reflector. The movable reflector is movable between at least a first position, a second position, and a third position. The spacing layer provides a filtering cavity.

DETAILED DESCRIPTION OF THE PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment comprises a display adopting tri-state interferometric modulating devices that have a high contrast ratio (CR) and a large gamut. In such a tri-state interferometric modulating device, a spacing layer provides better protection against shorting between the movable reflector and the electrodes. In one embodiment, the spacing layer defines a second interferometric modulating cavity that is found to provide saturated light over a range of light frequencies. As a result, the gamut of the display is enhanced.

Figure 1:
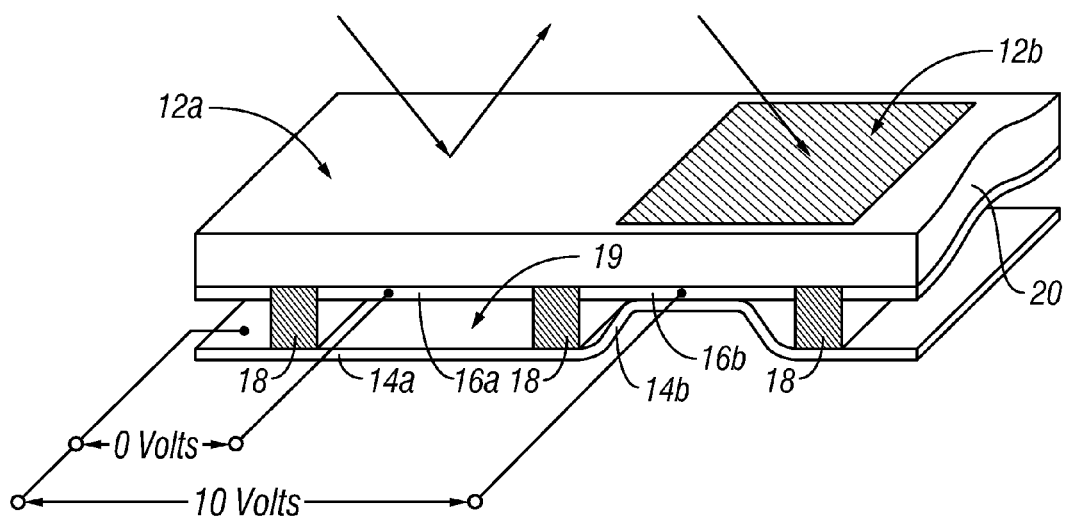
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b (collectively referred to as interferometric modulators 12). In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
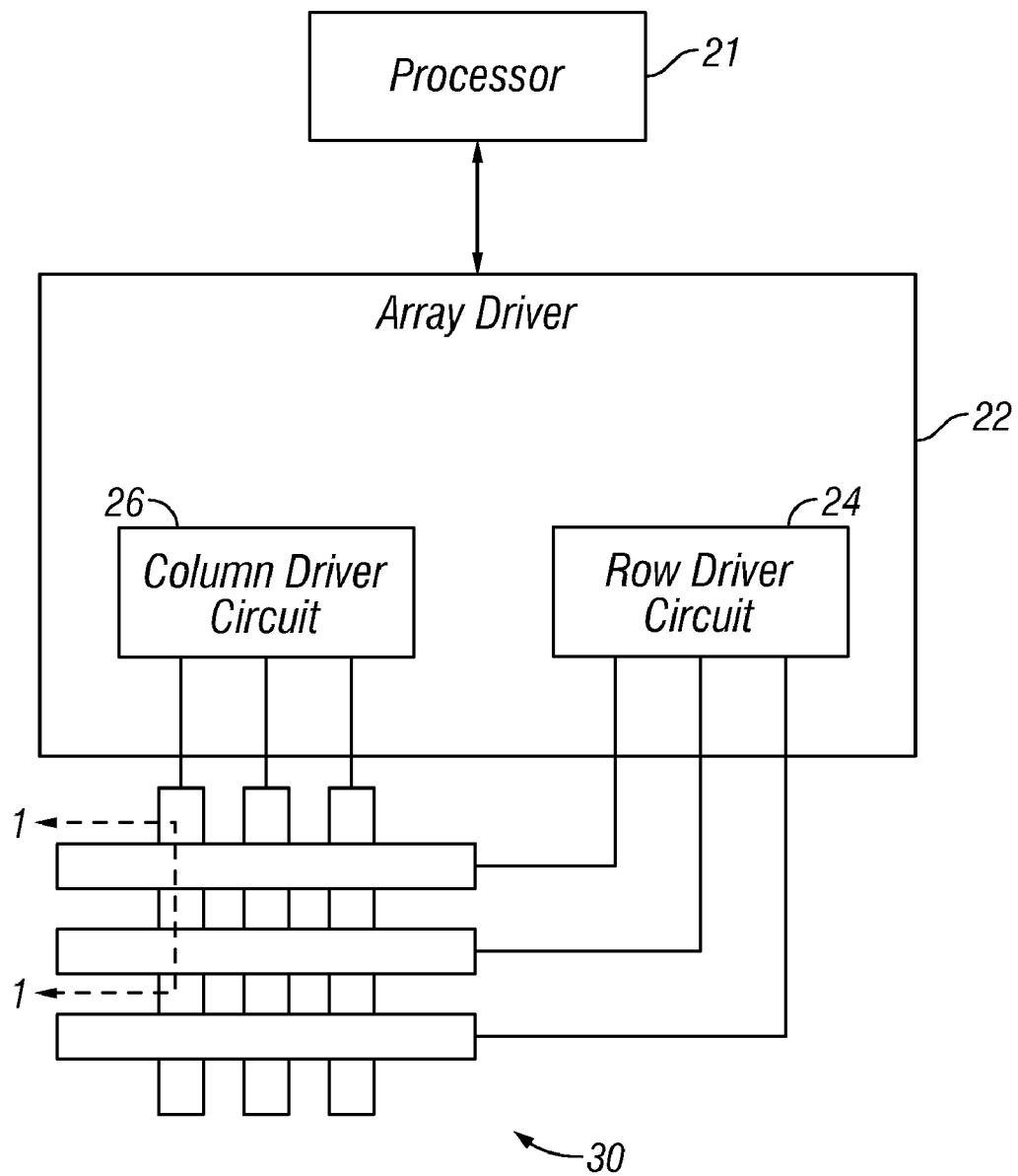
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
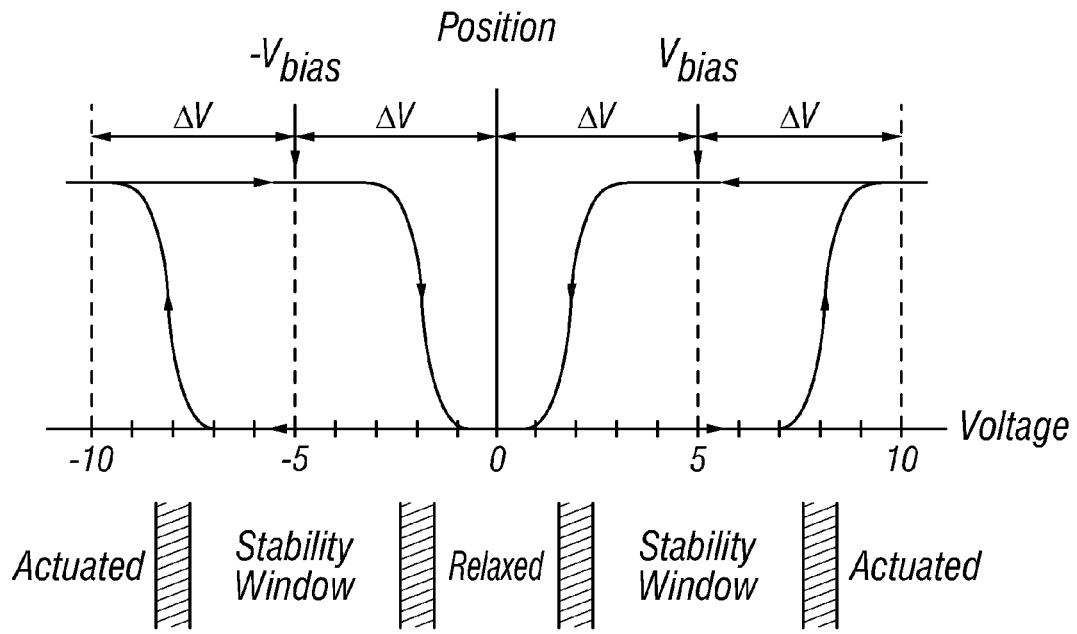
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
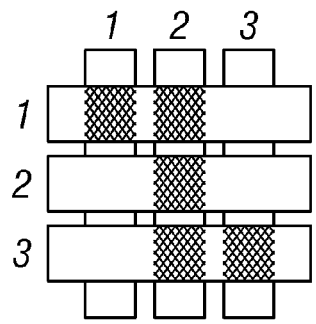
FIG. 5A illustrates one exemplary frame of display data in the 3×3 interferometric modulator display of FIG. 2.
Figure 5B:
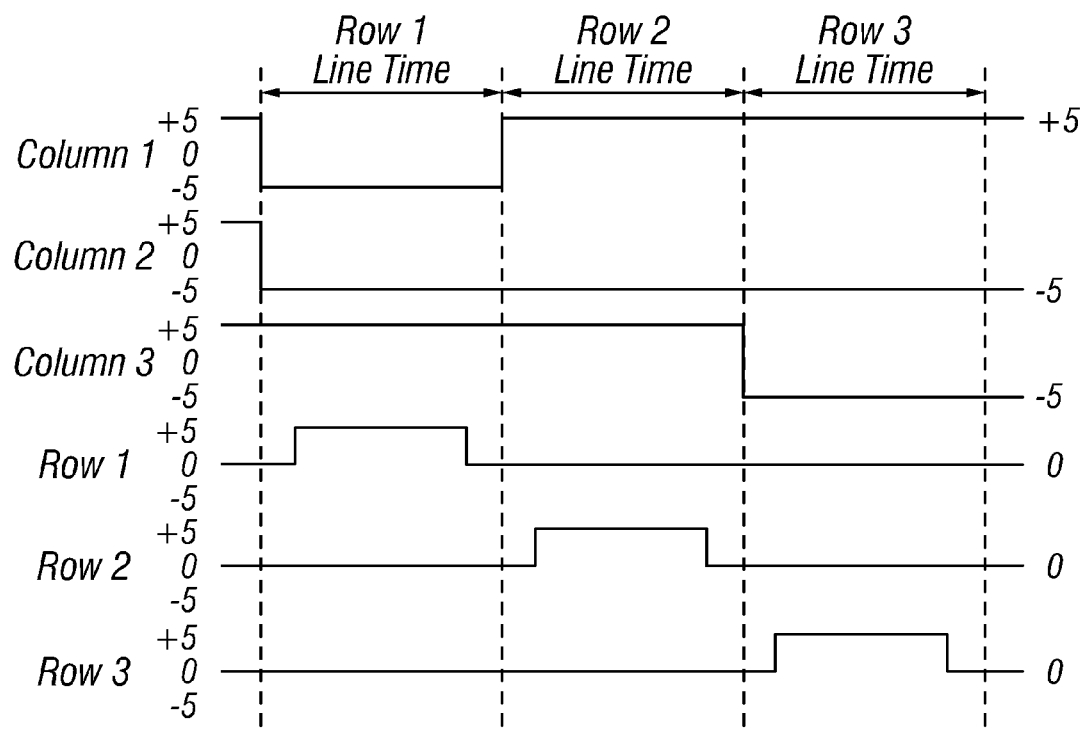
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to –5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to –5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to –5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to –5 volts, and column 1 to +5 volts. The row 3 strobe sets the row 3 pixels as shown in FIG. 5A. After writing the frame, the row potentials are zero, and the column potentials can remain at either +5 or –5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
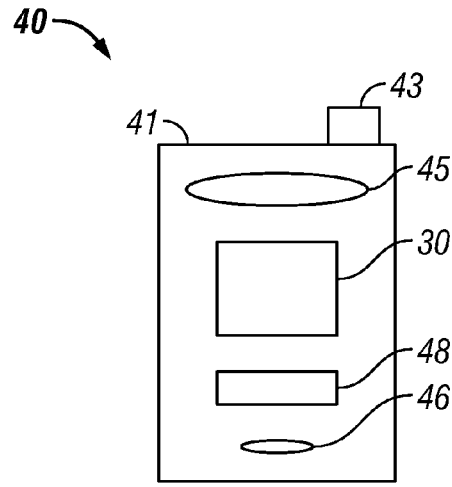
FIGS. 6A and 6B are system block diagrams illustrating an embodiment of a visual display device comprising a plurality of interferometric modulators.
Figure 6B:
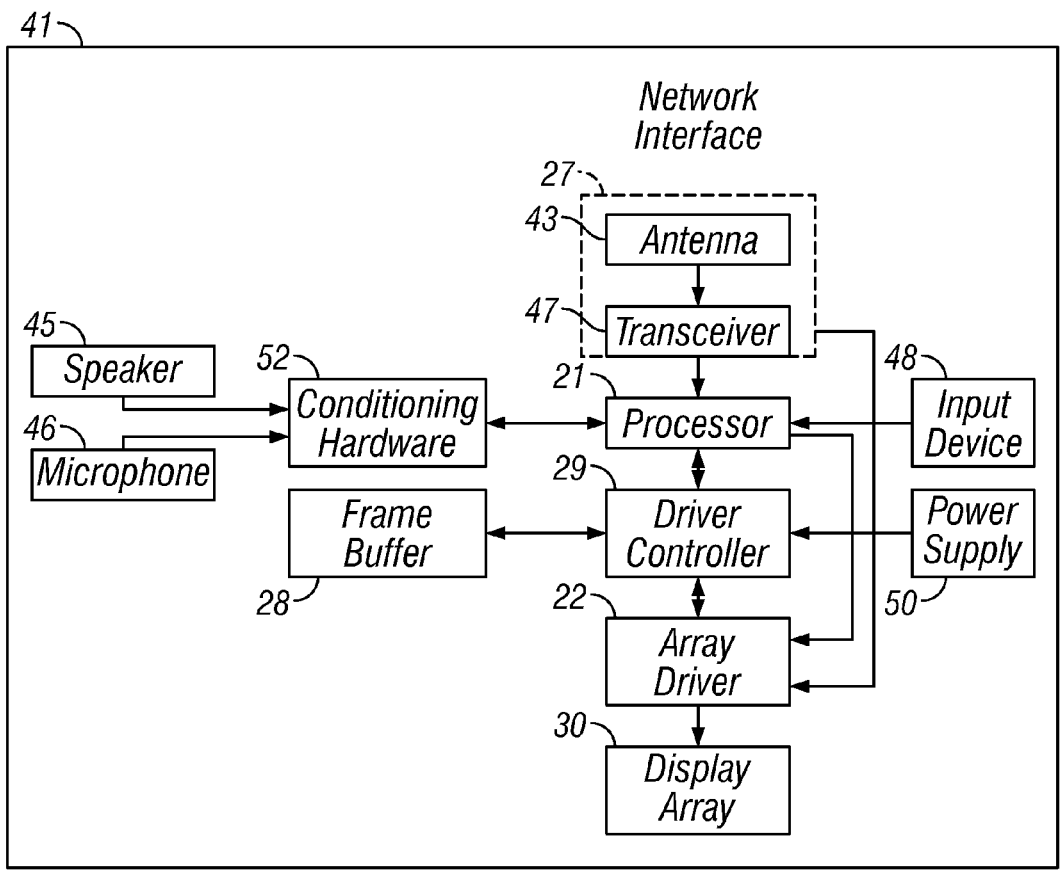

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
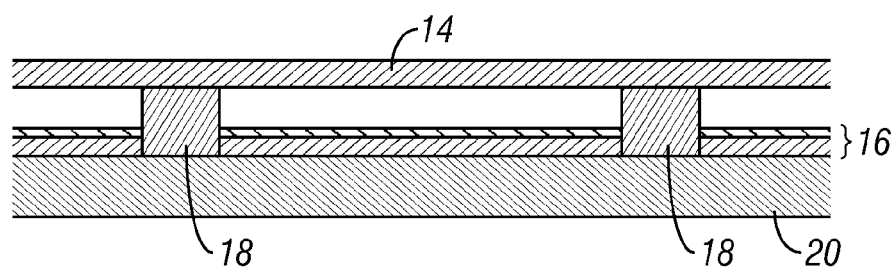
FIG. 7A is a cross section of the device of FIG. 1.
Figure 7B:
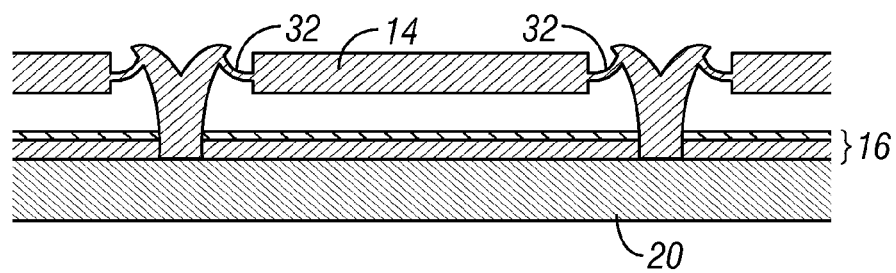
FIG. 7B is a cross section of an alternative embodiment of an interferometric modulator.
Figure 7C:
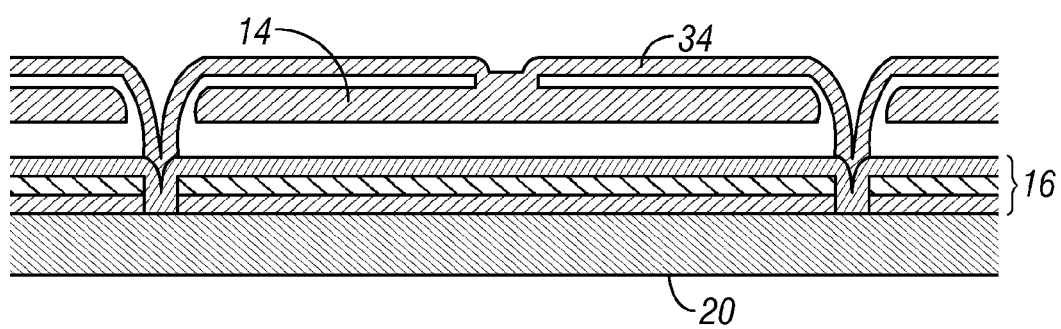
FIG. 7C is a cross section of another alternative embodiment of an interferometric modulator.
Figure 7D:
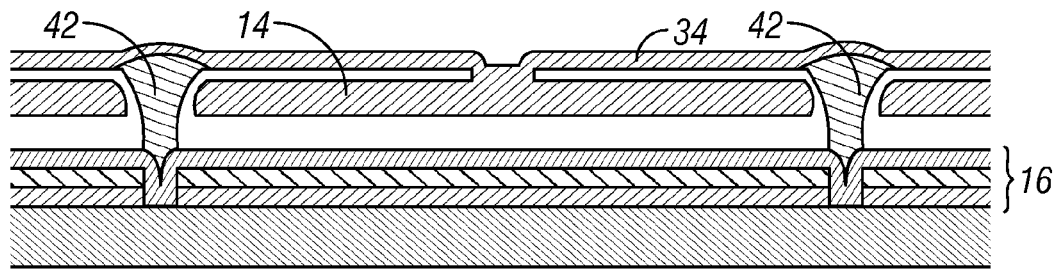
FIG. 7D is a cross section of yet another alternative embodiment of an interferometric modulator.
Figure 7E:
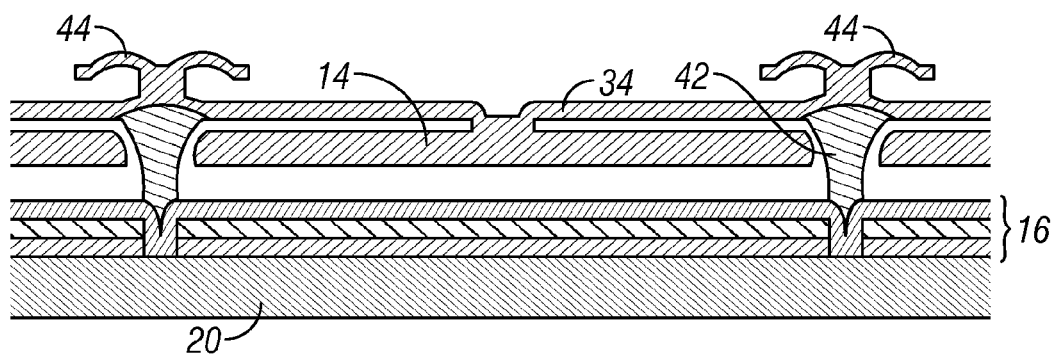
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

A common problem for all color displays, regardless of whether they are of the self-luminous type or the non-self-luminous type, is the synthesis of a full-color image from a limited set of primary colors. Several approaches to color synthesis have traditionally been employed for electronic displays. The most successful of these conform to the principles of additive color mixture and include optical superposition, spatial color synthesis, and temporal color synthesis.

Direct optical superposition of three primary color images is an effective and commonly used method in projection display systems, but is not readily amenable to most direct-view color display technologies. Spatial color synthesis has by far been the most successful method of color synthesis and remains the foundation of modern color display technology in devices like cathode ray tubes (CRT) and liquid crystal displays (LCD). Spatial color synthesis mixes sub-pixels of three or more primary colors (typically red (R), green (G) and blue (B)) in close proximity to generate a full spectrum.

An exemplary color display includes red, green, and blue display elements. Other colors are produced in such a display by varying the relative intensity of light produced by the red, green, and blue elements. Such mixtures of primary colors such as red, green, and blue are perceived by the human eye as other colors. The relative values of red, green, and blue in such a color system may be referred to as tristimulus values in reference to the stimulation of red, green, and blue light-sensitive portions of the human eye. The range of colors that can be produced by a particular display may be referred to as the color gamut of the display. In general, increasing the saturation of the primary colors increases the color gamut, or range of colors that can be produced by the display. While an exemplary color system based on red, green, and blue are disclosed herein, in other embodiments, the display may include modulators 12 (see FIG. 8) having sets of colors that define other color systems in terms of sets of primary colors other than red, green, and blue.

In one embodiment of the display, each pixel includes one or more color modulators 12, e.g., modulators configured to reflect red, green, and blue light, and one or more "white" modulators 12 configured to reflect white light. In such an embodiment, light from the red, green, and/or blue modulators 12 in their reflective states combines to output colored light. Light from the white modulators 12 can be used to output white light. Use of white in combination with color may increase the brightness or intensity of the pixels.

Figure 8:
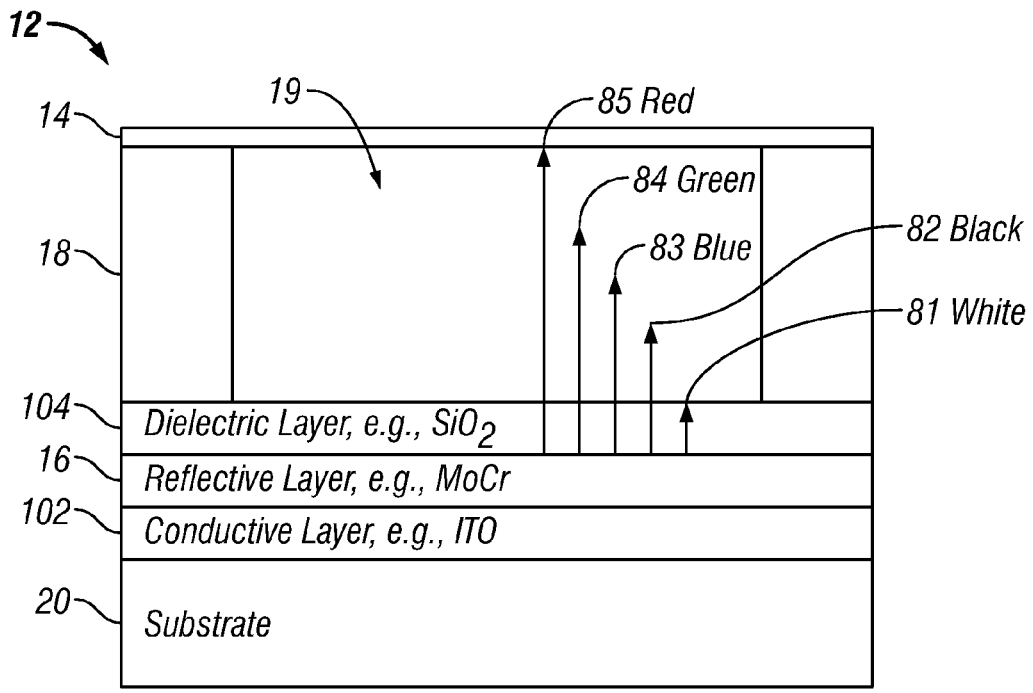
FIG. 8 is a schematic side cross-sectional view of a multi-state interferometric modulator.

FIG. 8 is a side cross-sectional view of an exemplary multi-state interferometric modulator 12. The multi-state interferometric modulator 12 reflects light having particular spectral characteristics by positioning the movable reflective layer (or reflector) 14 to one of a plurality of selected positions 81-85. As discussed above, a potential difference between a row and column electrode causes the movable reflective layer 14 to deflect. The exemplary modulator includes a conductive layer 102 of indium-tin-oxide (ITO) acting as a column electrode. In the exemplary modulator, the reflective layer 14 comprises an electronically conductive material which forms the row conductor.

In one embodiment, a dielectric layer 104 of a material such as silicon dioxide ($SiO_2$) is positioned over a layer of molybdenum-chromium (MoCr) that forms a reflective surface of the optical stack (or the fixed reflector) 16. As discussed above with reference to FIG. 1, the dielectric layer 104 prevents shorting and controls the separation distance between the movable reflector 14 and the fixed reflector 16 when the movable reflector 14 deflects. The optical cavity formed between the movable reflector 14 and the fixed reflector 16 thus includes the dielectric layer 104. The relative sizes of items in FIG. 8 have been selected for purposes of conveniently illustrating the modulator 12. Thus, such distances are not to scale and are not intended to be representative of any particular embodiment of the modulator 12.

As discussed above, the modulator 12 includes an interferometric modulating cavity formed between the movable reflector 14 and the fixed reflector 16. The characteristic distance, or effective optical path length, L, of the optical cavity determines the resonant wavelengths, $\lambda$, of the optical cavity and thus of the interferometric modulator 12. The resonant wavelength, $\lambda$, of the interferometric modulator 12 generally corresponds to the perceived color of light reflected by the modulator 12. Mathematically, the distance $L=\frac{1}{2}N\lambda$, where N is an integer. A given resonant wavelength, $\lambda$, is thus reflected by interferometric modulators 12 having distances L of $\frac{1}{2}\lambda$ (N=1), $\lambda$ (N=2), $\frac{3}{2}\lambda$ (N=3), etc. The integer N may be referred to as the order of interference of the reflected light. As used herein, the order of a modulator 12 also refers to the order N of light reflected by the modulator 12 when the movable reflector 14 is in at least one position. For example, a first order red interferometric modulator 12 may have a distance L of about 325 nm, corresponding to a wavelength λ of about 650 nm. Accordingly, a second order red interferometric modulator 12 may have a distance L of about 650 nm.

A list of examples of wavelength ranges for some common colors used in interferometric modulator displays are shown in the following table.

| Color | Wavelength (nm) |
|---|---|
| Violet | 380-420 |
| Indigo | 420-440 |
| Blue | 440-500 |
| Cyan | 500-520 |
| Green | 520-565 |
| Yellow | 565-590 |
| Orange | 590-625 |
| Red | 625-740 |

When the cavity 19 comprises a fluid having an index of refraction of approximately 1 (e.g., air), the effective optical path length, L, is substantially equal to the distance between the movable reflector 14 and the fixed reflector 16. When the cavity 19 comprises a fluid having an index of refraction of greater than 1, the effective optical path length, L, may be different from the distance between the movable reflector 14 and the fixed reflector 16.

In embodiments that include the dielectric layer 104, which has an index of refraction greater than one, the interferometric modulating cavity is formed to have the desired optical path length by selecting the distance between the movable reflector 14 and fixed reflector 16 and by selecting the thickness and index of refraction of the dielectric layer 104, or of any other layers between the movable reflector 14 and fixed reflector 16.

In one embodiment, the movable reflector 14 may be deflected to one or more positions within a range of positions to output light of a corresponding range of colors. For example, the voltage potential difference between the row and column electrodes may be adjusted to deflect the movable reflector 14 to one of a plurality of selected positions in relation to the fixed reflector 16.

Each of a particular group of positions 81-85 of the movable reflector 14 is denoted in FIG. 8 by a line extending from the fixed reflector 16 to an arrow point indicating the positions 81-85. Thus, the distances 81-85 are selected so as to account for the thickness and index of refraction of the dielectric layer 104. When the movable reflector 14 is deflected to each of the positions 81-85, each corresponding to a different distance L from the fixed reflector 16, the modulator reflects light to a viewing position at the substrate 20 side with a different spectral response that corresponds to different colors of incident light being reflected by the modulator 12.

Moreover, at position 81, the movable reflector 14 is sufficiently close to the fixed reflector 16, that the effects of interference are negligible and modulator 12 acts as a mirror that reflects substantially all colors of incident visible light substantially equally, e.g., as white light. The broadband mirror effect is caused because the small distance L is too small for optical resonance in the visible band. The reflective layer 14 thus merely acts as a reflective surface with respect to visible light.

At the position 82, the distance L is such that the cavity operates interferometrically but reflects substantially no visible wavelengths of light because the resonant wavelength is outside the visible range.

As the distance L is increased further, a peak spectral response of the modulator 12 moves into visible wavelengths. Thus, when the movable reflector 14 is at position 83, the modulator 12 reflects blue light. When the movable reflector 14 is at the position 84, the modulator 12 reflects green light. When the movable reflector 14 is at the non-deflected position 85, the modulator 12 reflects red light.

As noted above, having a separate state for outputting white light in a modulator 140 decouples the selection of the properties of the modulator controlling color saturation from the properties affecting the brightness of white output. The distance and other characteristics of the modulator 12 may thus be selected to provide a highly saturated color without affecting the white light produced in the first state. For example, in an exemplary color display, one or more of the red, green, and blue modulators 12 may be formed with optical path lengths L corresponding to a higher order of interference.

As discussed above, the dielectric layer 104 prevents shorting and controls the separation distance between the movable reflector 14 and the fixed reflector 16 when the movable reflector 14 deflects, but the thickness of the dielectric layer 104 should be sufficiently small so that the movable reflector 14 is sufficiently close to the fixed reflector 16, for example, at position 81, when modulator 12 reflects white light. However, the use of thin dielectric layer 104 alone does not provide adequate protection against shorting between the movable reflector 14 and the conductive layer 102.

The modulator 12 may be formed using lithographic techniques known in the art, and such as described above with reference to the modulator 12. For example, conductive layer 102 may be formed by depositing one or more layers of a transparent conductor such as ITO onto the substrate 20. The substrate 20 may comprise any transparent material such as glass or plastic. The substrate 20 may have been subjected to prior preparation step(s), e.g., cleaning, to facilitate efficient formation of a subsequently formed layer. The conductive layers 102 are patterned into parallel strips, and may form columns of electrodes. The fixed reflector 16 may be formed by depositing one or more layers of MoCr onto the substantially transparent substrate 20 and/or the substrate 20. The movable reflector 14 may be formed as a series of parallel strips of a deposited metal layer or layers (orthogonal to the column electrodes 102) deposited on top of posts 18 and an intervening sacrificial material deposited between the posts 18. Vias through one or more of the layers described above may be provided so that etchant gas, such as xenon difluoride, can reach the sacrificial layers. When the sacrificial material is etched away, the deformable metal layers are separated from the fixed layers by an air gap. A highly conductive and reflective material such as aluminum may be used for the deformable layers, and these strips may form row electrodes in a display device.

Figure 9:
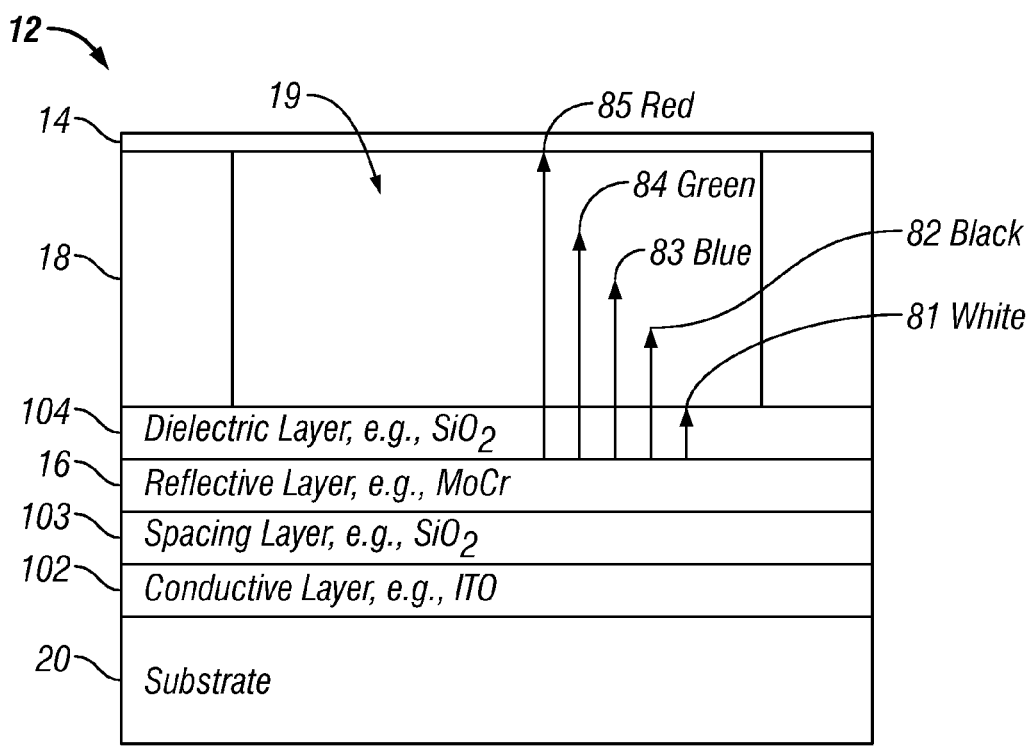
FIG. 9 is a schematic side cross-sectional view of a multi-state interferometric modulator having a spacing layer.

FIG. 9 is a side cross-sectional view of an exemplary multi-state interferometric modulator 12 with a spacing layer 103. In the multi-state interferometric modulator 12, a spacing layer 103 of a material such as silicon dioxide ($SiO_2$) is positioned between the fixed reflector 16 and the conductive layer 102. The spacing layer 103 increases the distance between the movable reflector 14 and the conductive layer 102 and therefore decreases the capacitance between the movable reflector 14 and the conductive layer 102 and provides adequate protection against shorting between the movable reflector 14 and the conductive layer 102.

At the same time, the spacing layer 103 defines a second interferometric modulating cavity between the fixed reflector 16 and the conductive layer 102. The thickness and composition (index of refraction) of the spacing layer 103 can be adjusted to vary the effective optical path length of the second interferometric modulating cavity to produce a desired color filter. For example, the spacing layer 103 may be adjusted so that the second interferometric modulating cavity acts as red, green or blue band pass filters as desired, and therefore the multi-state interferometric modulator 12 reflects saturated red, green or blue light.

The reflectance of the conductive layer 102 and the fixed reflector 16 is low, but the coupled cavity effect exhibited by the first interferometric modulating cavity and the second interferometric modulating cavities are sufficient to increase the color saturation of reflected light.

Saturation refers to the narrowness of the range of wavelengths of light output. A highly saturated hue has a vivid, intense color, while a less saturated hue appears more muted and grey. For example, a laser, which produces a very narrow range of wavelengths, produces highly saturated light. Conversely, a typical incandescent light bulb produces white light that may have a desaturated red or blue color.

Figure 10:
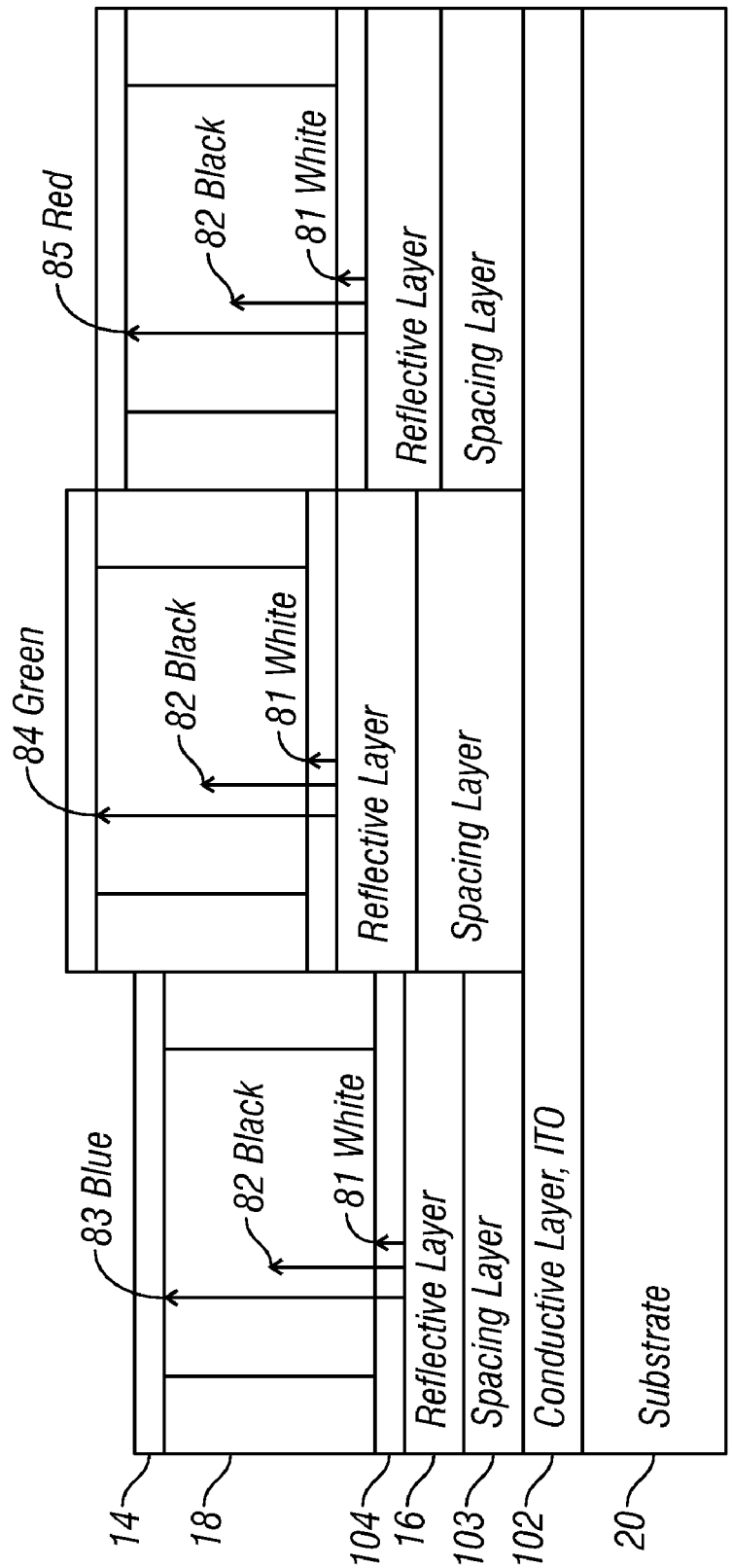
FIG. 10 is a schematic side cross-sectional view of a pixel including red, green and blue ti-state interferometric modulators that have different spacing layers.

In one embodiment of the display, each pixel includes one or more tri-state modulators 12 which have the structure as shown in FIG. 9 or similar structures. These tri-state modulators include at least a blue modulator, a green modulator, and a red modulator. FIG. 10 is a schematic side cross-sectional view of a pixel including three tri-state interferometric modulators 12 that have respective spacing layers. In FIG. 10, like parts are numbered similarly with respect to previous figures.

The blue modulator has three states. In the first state, the movable reflector 14 is at a first position, for example, position 81, and the blue modulator substantially reflects white light. In the second state, the movable reflector 14 is at a second position, for example, position 82, and the blue modulator substantially reflects no light. In the third state, the movable reflector 14 is at a third position, for example, position 83, and the blue modulator substantially reflects blue light.

The green modulator has three states. In the first state, the movable reflector 14 is at a first position, for example, position 81, and the green modulator substantially reflects white light. In the second state, the movable reflector 14 is at a second position, for example, position 82, and the green modulator substantially reflects no light. In the third state, the movable reflector 14 is at a third position, for example, position 84, and the green modulator substantially reflects green light.

The red modulator has three states. In the first state, the movable reflector 14 is at a first position, for example, position 81, and the red modulator substantially reflects white light. In the second state, the movable reflector 14 is at a second position, for example, position 82, and the red modulator substantially reflects no light. In the third state, the movable reflector 14 is at a third position, for example, position 85, and the red modulator substantially reflects red light.

In such an embodiment, light from the red, green, and/or blue modulators 12 in their third states combines to output colored light. Light from the red, green, and/or blue modulators 12 in their first and second states can be used to output white or black light. Use of white in combination with color may increase the brightness or intensity of the pixels.

In order to increase the saturation of the light from the red, green and blue modulators, the thickness and index of refraction of the spacing layer 103 is selected respectively for the red, green and blue modulators such that the second interferometric modulating cavities in the red, green and blue modulators have corresponding desired optical path lengths.

As described above, the spacing layer 103 can be of any material and of any thickness. For example, if the spacing layer 103 is of material $SiO_2$, the thickness of the spacing layer 103 for the red modulator is at least 140 nm. In one embodiment, when the thickness of the spacing layer 103 for the red modulator is 170 nm, the red light from the red modulator is highly saturated.

In one embodiment, if the spacing layer 103 is of material $SiO_2$, the thickness of the spacing layer 103 for the blue modulator is at least 210 nm. When the thickness of the spacing layer 103 for the blue modulator is 230 nm, the blue light from the blue modulator is highly saturated.

In one embodiment, if the spacing layer 103 is of material $SiO_2$, the thickness of the spacing layer 103 for the green modulator is at least 190 nm. When the thickness of the spacing layer 103 for the green modulator is 220 nm, the green light from the green modulator is highly saturated.

The production of an interferometric modulator device incorporating a spacing layer 103 between the conductive layer 102 and the fix reflector 16 requires only a few additional process steps compared to the production of an interferometric modulator device without the spacing layer 103. In the example illustrated in FIG. 9, incorporation of the spacing layer 103 requires only an additional step of depositing the spacing layer 103. The additional processing requirements can be further reduced or minimized if the spacing layer 103 comprises the same material as the dielectric layer 104 and/or if the conductive layer 102 is made of the same material as the fixed reflector 16.

Figure 11:
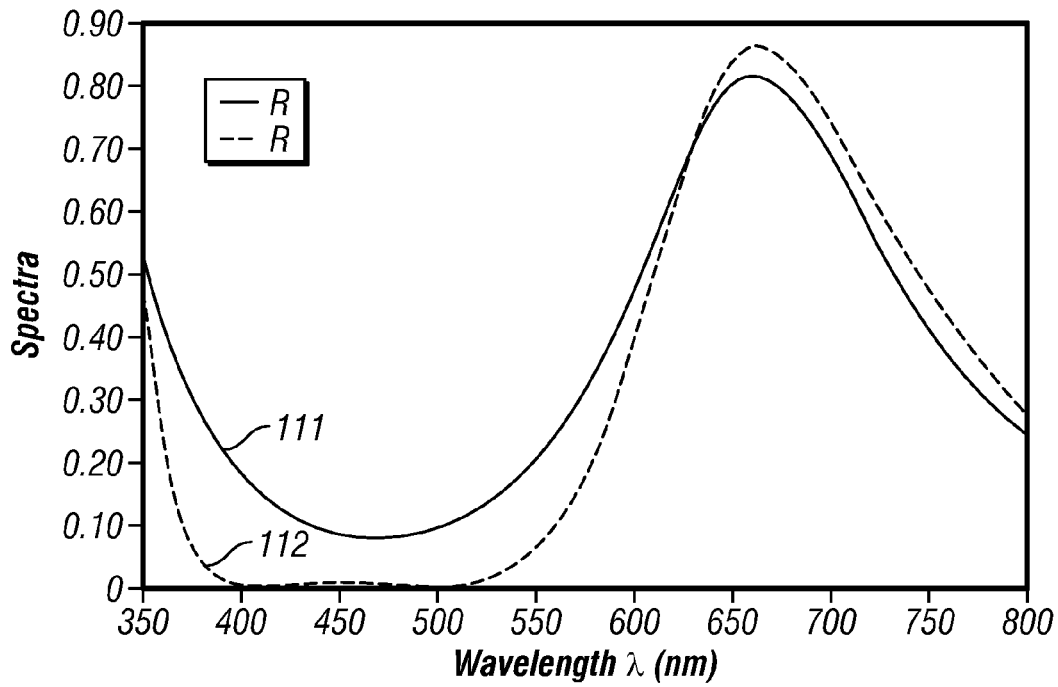
FIG. 11 shows an example of reflectance spectra for a red ti-state modulator.

FIG. 11 shows an example of the modeled reflectance spectra for two red tri-state modulators. Line 111 depicts the modeled spectral reflectance of a red tri-state modulator 12 having a 100 nm thick spacing layer 103 of $SiO_2$. Line 112 depicts the modeled spectral reflectance of another red tri-state modulator 12 having a 170 nm thick spacing layer 103 of $SiO_2$, to contrast with line 111. As illustrated in FIG. 11, the red tri-state modulator 12 having a 170 nm thick spacing layer 103 of $SiO_2$ provides higher saturation over the red frequencies, i.e., between 625 nm to 740 nm, than the red tri-state modulator 12 having a 100 nm thick spacing layer 103 of $SiO_2$.

Figure 12:
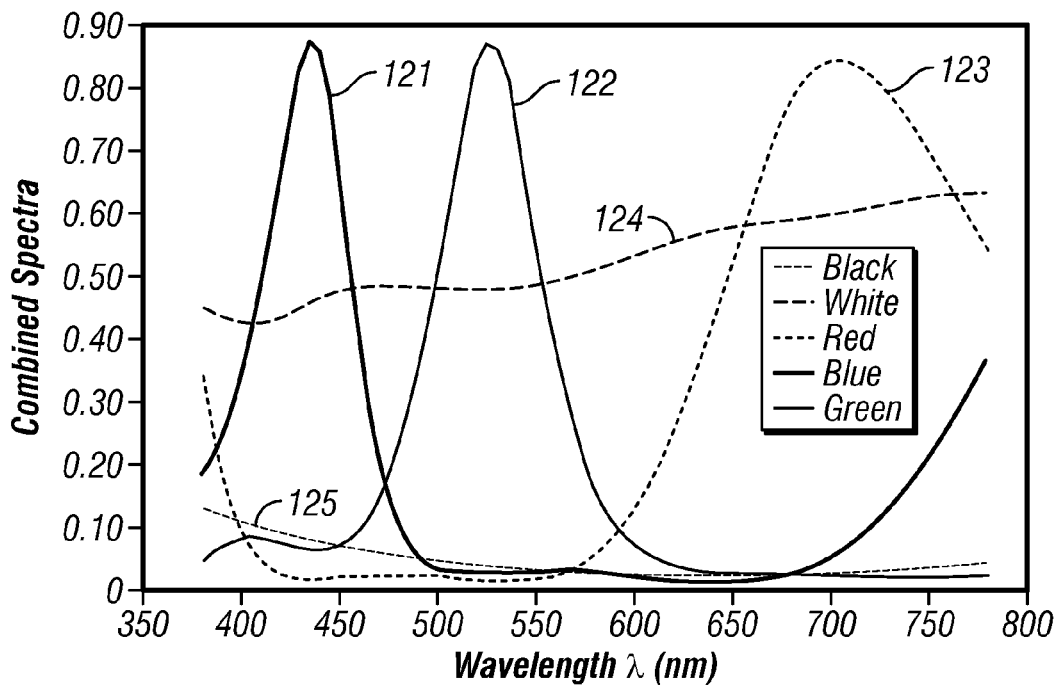
FIG. 12 shows an example of combined modeled reflectance spectra for red, green and blue tri-state modulators having different spacing layers.

FIG. 12 shows an example of combined modeled reflectance spectra for red, green and blue tri-state modulators having different spacing layers. Line 121 depicts the modeled spectral reflectance of the blue tri-state modulator 12 having a 230 nm thick spacing layer 103 of $SiO_2$. Line 122 depicts the modeled spectral reflectance of the green tri-state modulator 12 having a 220 nm thick spacing layer 103 of $SiO_2$. Line 123 depicts the modeled spectral reflectance of the red tri-state modulator 12 having a 170 nm thick spacing layer 103 of $SiO_2$. Line 124 depicts the modeled spectral reflectance when the red, green and blue tri-state modulators 12 are in the white state. Line 125 depicts the modeled spectral reflectance when the red, green and blue tri-state modulators 12 are in the black state.

Figure 13:
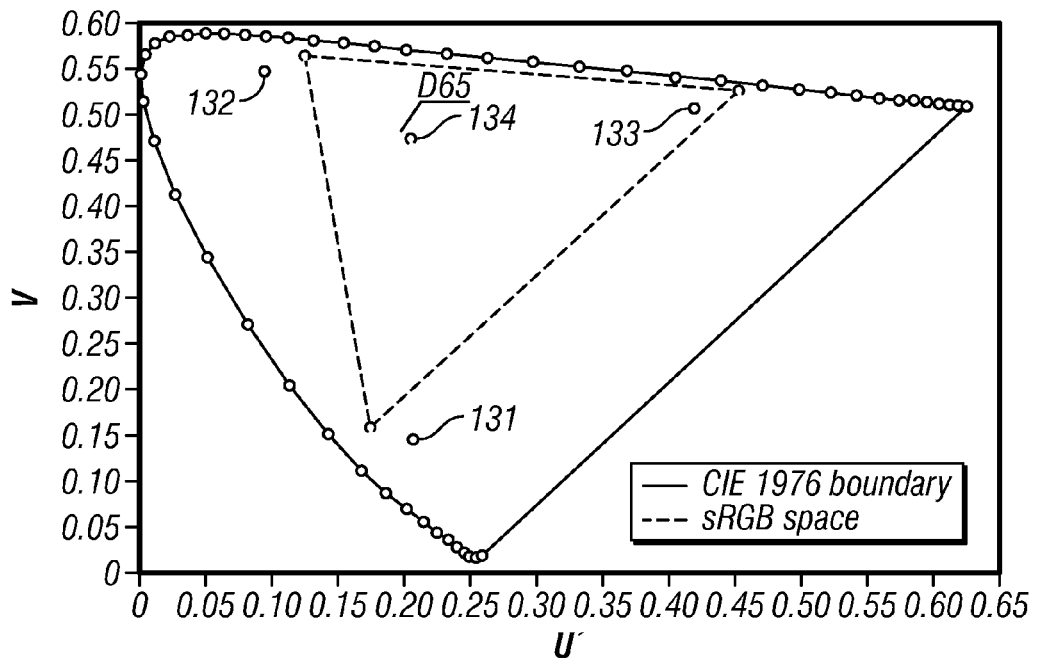
FIG. 13 shows the positions of the red, green and blue colors perceived in FIG. 12 in the CTE 1976 diagram.

FIG. 13 shows the positions of the red, green, blue, and white colors perceived in FIG. 12 in the CIE 1976 diagram. The color blue which is the perceived color of line 121 in FIG. 12 is depicted as point 131 in FIG. 13. The color green which is the perceived color of line 122 in FIG. 12 is depicted as point 132 in FIG. 13. The color red which is the perceived color of line 123 in FIG. 12 is depicted as point 133 in FIG. 13. The color white which is the perceived color of line 124 in FIG. 12 is depicted as point 134 in FIG. 13. As shown in FIG. 13, the points 131, 132 and 133 are very close to the sRGB primary coordinates, and the point 134 is very close to $D_{65}$. Here, sRGB is a standard RGB color space created cooperatively by HP™ and Microsoft™ for use on monitors, printers, and the Internet. $D_{65}$ is a standard white point of daylight, which is promulgated by the International Commission on Illumination (CIE) at the temperature of 6,500° K. D65 corresponds roughly to a midday sun in Western/Northern Europe.

Figure 14:
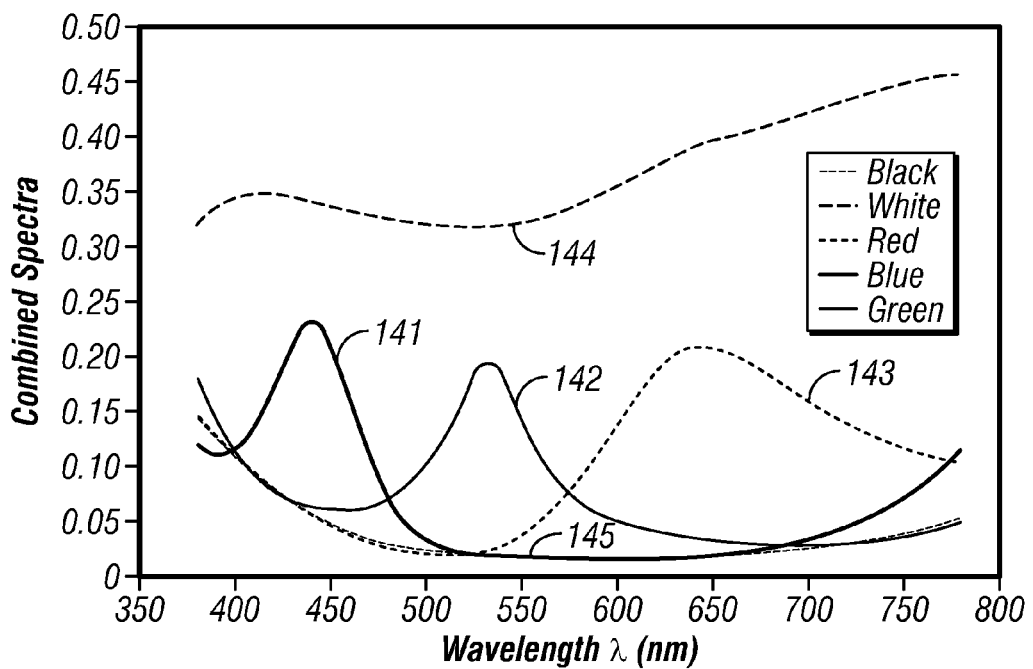
FIG. 14 shows an example of combined reflectance spectra for a display of a three-bit design.

FIG. 14 shows an example of combined reflectance spectra for a display of a three-bit design. In this embodiment, the display has a plurality of red, green and blue tri-state modulators. Each pixel comprises a red subpixel, a green subpixel, and a blue subpixel. Each of the red, green and blue subpixels is represented by three bits. For each subpixel, one tri-state interferometric modulator is associated with the first bit. Two tri-state interferometric modulators are associated with the second bit. Four tri-state interferometric modulators are associated with the third bit. Therefore, seven tri-state interferometric modulators are associated with each subpixel, and twenty one tri-state interferometric modulators are associated with each pixel. This embodiment is only an example. Those skilled in the art may appreciate that numerous variations are possible.

Line 141 depicts the spectral reflectance of the blue tri-state modulators for the blue subpixel. Line 142 depicts the spectral reflectance of the green tri-state modulators for the green subpixel. Line 143 depicts the spectral reflectance of the red tri-state modulators for the red subpixel. Line 144 depicts the spectral reflectance when the red, green and blue tri-state modulators are in the white state. Line 145 depicts the spectral reflectance when the red, green and blue tri-state modulators are in the black state.

Experiment with the three-bit design display showed the effects as shown in the following table.

|  | Color | | | | |
| --- | --- | --- | --- | --- | --- |
|  | White | Black | Red | Green | Blue |
| Gamut | 38.344 | | | | |
| Contrast Ratio | 18.359 | | | | |
| Brightness (Y) | 0.334 | 0.01819 | 0.06882 | 0.1083 | 0.02269 |

As shown above, the three-bit design display demonstrated a modeled gamut of 38% EBU (European Broadcast Union). The contract ration (CR) was modeled to be 18:1. The brightness (Y) was modeled to be 33%.

Figure 15:
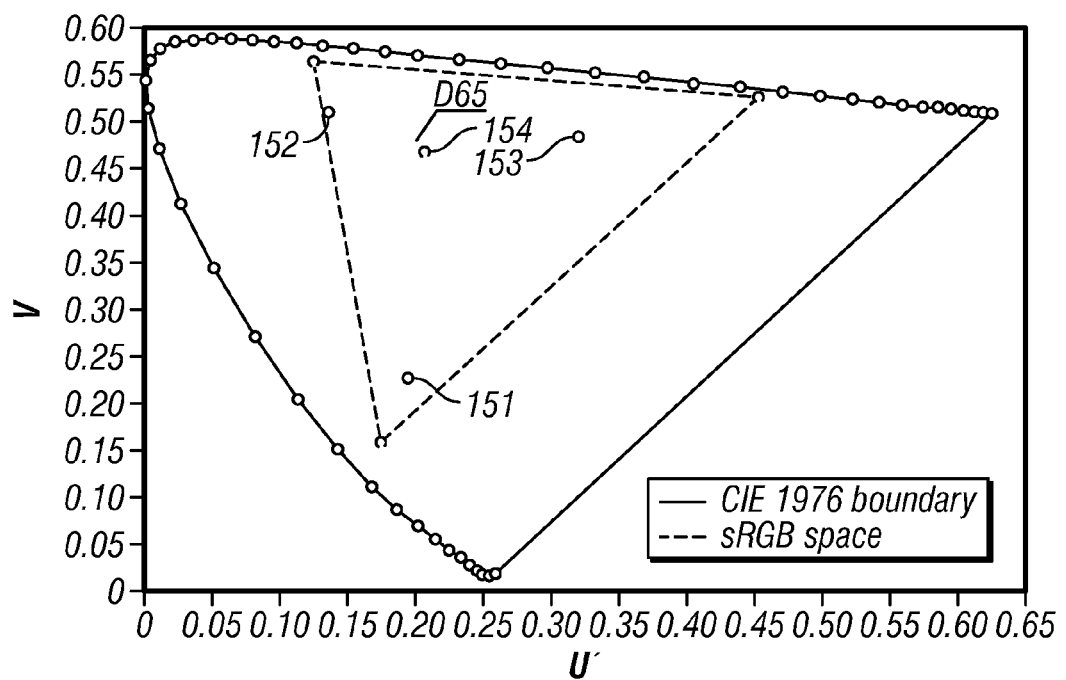
FIG. 15 shows the positions of the red, green and blue colors perceived in FIG. 14 in the CTE 1976 diagram.

FIG. 15 shows the positions of the red, green and blue colors perceived in FIG. 14 in the CIE 1976 diagram. The color blue which is the perceived color of line 141 in FIG. 14 is depicted as point 151 in FIG. 15. The color green which is the perceived color of line 142 in FIG. 14 is depicted as point 152 in FIG. 15. The color red which is the perceived color of line 143 in FIG. 14 is depicted as point 153 in FIG. 15. The color white which is the perceived color of line 144 in FIG. 14 is depicted as point 154 in FIG. 15. As shown in FIG. 15, the points 151, 152 and 153 are very close to the sRGB primary coordinates, and the point 154 is very close to $D_{65}$.

As described above, in a tri-state interferometric modulator, a spacing layer may be provided between the fixed reflector and the electrodes. The spacing layer may provide adequate protection against shorting between the movable device and the electrodes. The spacing layer may also define a second interferometric modulating cavity so as to provide saturated light over a range of light frequencies. Thus, a display adopting such tri-state interferometric modulators may have a longer service life, a higher contrast ratio and a larger gamut.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by the claims that follow.

What is claimed is:

1. A device comprising:
   an electrode;
   a fixed reflector;
   a movable reflector comprising an electrically conductive material, wherein an interferometric modulating cavity is defined between the movable reflector and the fixed reflector, the movable reflector being movable between at least a first position, a second position, and a third position; and
   a spacing layer positioned between the fixed reflector and the electrode, wherein the spacing layer comprises a filtering cavity configured to improve color saturation of the interferometric modulating cavity.

2. The device of claim 1, wherein the thickness of the spacing layer is at least 160 nm.

3. The device of claim 1, wherein the device reflects red light when the movable reflector is at the third position, and wherein the spacing layer comprises $SiO_2$ and a thickness of the spacing layer is at least 140 nm.

4. The device of claim 1, wherein the device reflects blue light when the movable reflector is at the third position, and wherein the spacing layer comprises $SiO_2$ and a thickness of the spacing layer is at least 210 nm.

5. The device of claim 1, wherein the device reflects green light when the movable reflector is at the third position, and wherein the spacing layer comprises $SiO_2$ and a thickness of the spacing layer is at least 190 nm.

6. The device of claim 1, wherein the device reflects white light when the movable reflector is at the first position and does not reflect light when the movable reflector is at the second position.

7. The device of claim 1, wherein the filtering cavity comprises another interferometric modulation cavity that is defined between the fixed reflector and the electrode.

8. The device of claim 1, further comprising:
   a display;
   a processor that is configured to communicate with the display, the processor being configured to process image data; and a memory device that is configured to communicate with the processor.

9. The device of claim 8, further comprising a driver circuit configured to send at least one signal to the display.

10. The device of claim 9, further comprising a controller configured to send at least a portion of the image data to the driver circuit.

11. The device of claim 8, further comprising an image source module configured to send the image data to the processor.

12. The device of claim 11, wherein the image source module comprises at least one of a receiver, transceiver, and transmitter.

13. The device of claim 8, further comprising an input device configured to receive input data and to communicate the input data to the processor.

14. A device comprising:
   an electrode;
   a fixed reflector;
   a movable reflector comprising an electrically conductive material, wherein an interferometric modulating cavity is defined between the movable reflector and the fixed reflector, the movable reflector being movable between at least a first position, a second position, and a third position; and
   a spacing layer positioned between the fixed reflector and the electrode, the spacing laying being greater than or equal to 160 nm in thickness from a cross-sectional view of the device, wherein the spacing layer comprises a filtering cavity configured to improve color saturation of the interferometric modulating cavity.

15. The device of claim 14, wherein the spacing layer filtering cavity comprises another interferometric modulating cavity that is defined between the fixed reflector and the electrode.

16. A device comprising:
   an electrode;
   first means for reflecting light, the first reflecting means being fixed;
   second means for reflecting light, the second reflecting means being movable and comprising an electrically conductive material, wherein an interferometric modulating cavity is defined between the first reflecting means and the second reflecting means, the second reflecting means being movable between at least a first position, a second position, and a third position; and
   means for separating the first reflecting means and the electrode, wherein the means for separating the first reflecting means and the electrode comprises a filtering cavity configured to improve color saturation of the interferometric modulating cavity.

17. The device of claim 16, wherein the thickness of the separating means is at least 160 nm.

18. The device of claim 16, wherein the device reflects red light when the second reflecting means is at the third position, and wherein the separating means comprises $SiO_2$ and a thickness of the separating means is at least 140 nm.

19. The device of claim 16, wherein the device reflects blue light when the second reflecting means is at the third position, and wherein the separating means comprises $SiO_2$ and a thickness of the separating means is at least 210 nm.

20. The device of claim 16, wherein the device reflects green light when the second reflecting means is at the third position, and wherein the separating means comprises $SiO_2$ and a thickness of the separating means is at least 190 nm.

21. The device of claim 16, wherein the device reflects white light when the second reflecting means is at the first position and does not reflect light when the second reflecting means is at the second position.

22. The device of claim 16, wherein the filtering cavity comprises another interferometric modulating cavity that is defined between the first reflecting means and the electrode.

23. A method of making a device for modulating light, the method comprising:
   forming an electrode;
   forming a spacing layer;
   forming a fixed reflector; and
   forming a movable reflector comprising an electrically conductive material;
   wherein an interferometric modulating cavity is defined between the movable reflector and the fixed reflector, the movable reflector being movable between at least a first position, a second position, and a third position; and
   wherein the spacing layer provides comprises a filtering cavity configured to improve color saturation of the interferometric modulating cavity.

24. The method of claim 23, wherein the thickness of the spacing layer is at least 160 nm.

25. The method of claim 23, wherein the device reflects red light when the movable reflector is at the third position, and wherein the spacing layer comprises $SiO_2$ and a thickness of the spacing layer is at least 140 nm.

26. The method of claim 23, wherein the device reflects blue light when the movable reflector is at the third position, and wherein the spacing layer comprises $SiO_2$ and a thickness of the spacing layer is at least 210 nm.

27. The method of claim 23, wherein the device reflects green light when the movable reflector is at the third position, and wherein the spacing layer comprises $SiO_2$ and a thickness of the spacing layer is at least 190 nm.

28. The method of claim 23, wherein the device reflects white light when the movable reflector is at the first position and does not reflect light when the movable reflector is at the second position.

29. The method of claim 23, wherein the filtering cavity comprises another interferometric modulating cavity that is defined between the fixed reflector and the electrode.

\* \* \* \* \*

UNITED STATES PATENT AND TRADEMARK OFFICE
CERTIFICATE OF CORRECTION

PATENT NO. : 7,612,933 B2  Page 1 of 1
APPLICATION NO. : 12/057161
DATED : November 3, 2009
INVENTOR(S) : Kostadin Djordjev It is certified that error appears in the above-identified patent and that said Letters Patent is hereby corrected as shown below:

Title Page 3, Column 2 (Item 56 - Other Publications), Line 12, delete "Liquivista" and insert -- Liquavista --, therefor.

At Column 2, Line 46, delete "ti-state" and insert -- tri-state --, therefor.

At Column 2, Line 49, delete "ti-state" and insert -- tri-state --, therefor.

At Column 15, Line 5, delete "$D_{65}$" and insert -- D65 --, therefor.

At Column 15, Line 8, delete "$D_{65}$" and insert -- D65 --, therefor.

At Column 15, Line 63, delete "$D_{65}$" and insert -- D65 --, therefor.

At Column 17, Line 32, in Claim 15, delete "spacing layer".

At Column 18, Line 30 (Approx), in Claim 23, delete "provides".

Signed and Sealed this

Twenty-seventh Day of July, 2010

David J. Kappos
*Director of the United States Patent and Trademark Office*